(12) United States Patent
Toma et al.

(10) Patent No.: US 12,103,867 B2
(45) Date of Patent: Oct. 1, 2024

(54) ATTACHMENT ASSEMBLY FOR QUARTZ SLEEVE SUPPORT IN A UV CYLINDER ASSEMBLY

(71) Applicant: ADVANCED UV INC., Cerritos, CA (US)

(72) Inventors: Mark Toma, Cerritos, CA (US); Andy Le, Cerritos, CA (US)

(73) Assignee: ADVANCED UV, INC., Cerritos, CA (US)

( * ) Notice: Subject to any disclaimer, the term of this patent is extended or adjusted under 35 U.S.C. 154(b) by 244 days.

(21) Appl. No.: 15/913,814

(22) Filed: Mar. 6, 2018

(65) Prior Publication Data
US 2019/0276335 A1    Sep. 12, 2019

(51) Int. Cl.
*C02F 1/32* (2023.01)
*B23P 19/04* (2006.01)

(52) U.S. Cl.
CPC .............. *C02F 1/325* (2013.01); *B23P 19/04* (2013.01); *C02F 2303/04* (2013.01)

(58) Field of Classification Search
CPC ................. C02F 1/325; C02F 2303/04; C02F 2201/004; C02F 2201/3223; B23P 19/04
USPC ...................................... 250/455.11
See application file for complete search history.

(56) References Cited

U.S. PATENT DOCUMENTS

| | | | |
|---|---|---|---|
| 2,667,584 A | 1/1954 | Rhodes | |
| 4,002,918 A | 1/1977 | Graentzel | |
| 4,367,410 A | 1/1983 | Wood | |
| 4,767,932 A * | 8/1988 | Ellner | A61L 2/10 250/435 |

(Continued)

FOREIGN PATENT DOCUMENTS

| | | |
|---|---|---|
| CN | 102405191 A | 4/2012 |
| JP | H2-76993 A | 12/1991 |

(Continued)

OTHER PUBLICATIONS

United States Patent & Trademark Office, International Search Report & Written Opinion for International Application No. PCT/US 19/30921, entitled Attachment Assembly for Quartz Sleeve Support by Mark Toma and Andy Le, dated Jul. 24, 2019, 7 pages, WIPO.

Taiwan Intellectual Property Office, First Office Action for corresponding TW patent application No. 108117991, entitled Attachment Assembly for Quartz Sleeve Support by Mark Toma and Andy Le, dated Apr. 17, 2020, 5 pages, TIPO.

(Continued)

*Primary Examiner* — Kiet T Nguyen
(74) *Attorney, Agent, or Firm* — Charles C. H. Wu; Wu & Reddy, APC

(57) ABSTRACT

A method and an attachment assembly for supporting a quartz sleeve, comprises at least one vibration resistant member, a collar attachment member and a support plate. The at least one vibration resistant member is adaptable to hold and support the quartz sleeve positioned inside an ultraviolet (UV) cylinder and thereby to prevent its vibration. The collar attachment member is configured to enclose the at least one vibration resistant member. The at least one vibration resistant member is positioned inside the collar attachment member. The support plate is configured to attach the collar attachment member containing the at least one vibration resistant member with the UV cylinder. The attachment assembly can be attached to the UV cylinder wall directly or can be attached to a mounting device inside the UV cylinder wall.

17 Claims, 4 Drawing Sheets

(56) References Cited

U.S. PATENT DOCUMENTS

| | | | |
|---|---|---|---|
| 4,922,114 A | 5/1990 | Boehme | |
| 5,030,125 A | 7/1991 | Toma | |
| 5,372,781 A | 12/1994 | Hallett et al. | |
| 5,545,335 A * | 8/1996 | Sween | A61H 33/0087 134/29 |
| 6,022,511 A | 2/2000 | Matschke | |
| 6,752,971 B2 | 6/2004 | Boehme | |
| 7,981,285 B2 | 7/2011 | Thorpe | |
| 2005/0069463 A1 * | 3/2005 | Kurtz | F24F 3/16 422/121 |
| 2007/0241288 A1 * | 10/2007 | Wang | C02F 1/325 250/436 |
| 2012/0248330 A1 * | 10/2012 | Lee | A61L 2/10 250/438 |
| 2014/0374620 A1 * | 12/2014 | Quintel | C02F 1/325 250/436 |
| 2015/0284265 A1 * | 10/2015 | Borkar | C02F 1/325 210/192 |

FOREIGN PATENT DOCUMENTS

| | | |
|---|---|---|
| JP | 2012-517350 A | 8/2012 |
| JP | 2018-023944 A | 2/2018 |
| KR | 2006-0117144 A | 11/2006 |
| KR | 10-1012755 B | 2/2011 |

OTHER PUBLICATIONS

Japan Intellectual Property Office, First Office Action for corresponding JP patent application No. 2019-214035, entitled Attachment Assembly for Quartz Sleeve Support by Mark Toma and Andy Le, dated May 27, 2020, 5 pages, JIPO.

Korean Intellectual Property Office, First Office Action for corresponding KR patent application No. 10-2019-0023911, entitled Attachment Assembly for Quartz Sleeve Support by Mark Toma and Andy Le, dated Apr. 17, 2020, 6 pages, KIPO.

Japan Intellectual Property Office, Office Action for related JP patent application No. 2019-039275, entitled Attachment Assembly for Quartz Sleeve Support by Mark Toma and Andy Le, dated Feb. 2, 2021, 2 pages, JIPO.

Taiwan Intellectual Property Office, Office Action for related TW patent application No. 109140441, entitled Attachment Assembly for Quartz Sleeve Support by Mark Toma and Andy Le, dated Jun. 7, 2021, 2 pages, TIPO.

Korean Intellectual Property Office, Office Action for related KR patent application No. 10-2019-0023911, entitled Attachment Assembly for Quartz Sleeve Support by Mark Toma and Andy Le, dated Apr. 17, 2020, 9 pages, KIPO.

Taiwan Intellectual Property Office, Search Report for related TW patent application No. 109140441, entitled Attachment Assembly for Quartz Sleeve Support by Mark Toma and Andy Le, dated Jun. 7, 2021, 1 page, TIPO.

* cited by examiner

ATTACHMENT ASSEMBLY FOR QUARTZ SLEEVE SUPPORT IN A UV CYLINDER ASSEMBLY

BACKGROUND OF THE DISCLOSURE

Technical Field of the Disclosure

The present disclosure relates generally to quartz sleeve assemblies, and more particularly to an attachment assembly that eliminates the amount of vibration in a quartz sleeve.

Description of the Related Art

There is a need for disinfected and purified water for human consumption as well as various water treatment methods and systems for industrial application. Water filters are very efficient in removing many common contaminants and impurities found in water. However, to disinfect and treat fluids, ultraviolet (UV) light is used to efficiently treat fluids. An ultraviolet water treatment unit includes a cylindrical chamber having a UV source fixed with an O-ring seal at both ends of the quartz sleeve or at one end with a domed quartz sleeve. The quartz sleeve extends from one end to other end of the chamber and is fixed at both ends. The fluid treatment unit or water reactor that contains the UV light source allows light to be absorbed by the fluids that pass through the reactor. Some fluid treatment units provide high flow rate of water to a user. The UV fluid treatment unit contains the UV lamp, which allows UV light to be absorbed by the fluids that pass through the reactor. Some UV fluid treatment units use long UV lamps and quartz sleeves for high flow rate application. Such high flow rate results in quartz sleeve vibration during operation. The high amount of vibration causes lamp and quartz sleeve to contact and accelerates lamp failures. Hence some support assemblies are required to prevent the vibration of quartz sleeve and reduce UV lamp vibration, resulting in improved UV lamp performance.

Several attachment assemblies have been developed to support quartz sleeve with the goal of reducing the amount of vibration on them during operation. One such ultraviolet water disinfection reactor for installing in an existing water pipeline includes a plurality of sleeves that extend through the body transversely to the axial direction of flow. However, this reactor fails to provide any means to prevent vibration of the plurality of quartz sleeves. Another UV fluid treatment system for treatment of water resident in a vessel includes one or more UV lamps mounted in quartz sleeves that surround the lamps for immersion in water and that are supported to protect the sleeves and lamps from vibration damage. In this fluid treatment system, a combination of a spring at one end and a resilient O-ring at the other, therefore form a cushioning or shock absorbing suspension or support for the sleeve that shields the sleeve and lamp from damage during periods of severe vibration. However, as the end of the quartz sleeve is domed and secured against the distal wall by a spring and the O-ring is placed over the other end of the sleeve, it only provides support at both ends and cannot effectively minimize vibration. Further, as the system provides support only at both ends, the quartz sleeve bends upwards due to buoyancy inside the UV reactor once the reactor is filled with fluid. Moreover, it is important to keep the UV lamp centered within the quartz sleeve for lamp performance and efficiency. The clearance gap between the UV lamp and the quartz sleeve acts as insulation barrier between water and UV lamp for optimum UV light performance.

There is thus a need for an attachment assembly for preventing the vibration in the quartz sleeve in a UV water reactor. Such an attachment assembly would provide another point of contact within the cylinder of the UV water reactor to maintain the quartz sleeve in a straight position between the O-ring sealed ends. Such an attachment assembly would support the quartz sleeve at an additional location within the UV reactor/cylinder and provide support around the quartz sleeve at 360 degrees. Further, such an attachment assembly would keep the UV lamp centered within the quartz sleeve for increased lamp performance and efficiency. Such a system would guide the quartz sleeve through the UV reactor, from endplate to endplate and ease the process of installation. The present embodiment overcomes shortcomings in the field by accomplishing these critical objectives.

SUMMARY OF THE DISCLOSURE

To minimize the limitations found in the existing systems and methods, and to minimize other limitations that will be apparent upon the reading of this specification, the preferred embodiment of the present invention provides a method and attachment assembly that eliminates the amount of vibration in a quartz sleeve in an ultraviolet (UV) reactor.

The attachment assembly comprises at least one vibration resistant member, a collar attachment member and a support plate. The at least one vibration resistant member is adaptable to hold and support the quartz sleeve positioned inside a UV cylinder and thereby to prevent its vibration. The at least one vibration resistant member is an O-ring and is made from a material selected from a group consisting of: Teflon, rubber, elastomer, or a metal spring. The collar attachment member is configured to enclose the at least one vibration resistant member. The at least one vibration resistant member is positioned inside the collar attachment member. The at least one vibration resistant member is enclosed by the collar attachment member such that there is little to no space left therebetween and hence limits movement between the. members The support plate is configured to attach the collar attachment member containing the at least one vibration resistant member with the UV cylinder. The attachment assembly can be attached to the UV cylinder directly or can be attached to a ring positioned inside the UV cylinder. When the attachment assembly is attached inside with the UV cylinder, the quartz sleeve is guided through the at least one vibration resistant member from a first end plate to a second end plate of the UV cylinder. The attachment assembly is attached to a ring or directly on the inner side of the UV cylinder of a reactor holding the quartz sleeve.

The method for utilizing an attachment assembly for preventing vibration of a quartz sleeve positioned inside the UV cylinder comprises the steps of: providing the attachment assembly having at least one vibration resistant member enclosed by a collar attachment member connected with a support plate. Then mounting the attachment assembly to a ring positioned at a fixed location at a distance inside the UV cylinder. Inserting the quartz sleeve into the UV cylinder through a first end plate of the UV and guiding the quartz sleeve through the at least one vibration resistant member enclosed by the collar attachment member. Attaching the quartz sleeve with a second end plate of the UV cylinder. Holding and supporting the quartz sleeve steadily by the at least one vibration resistant member enclosed by the collar attachment member to prevent vibration.

It is a first objective of the present invention to provide a method and an attachment assembly that reduces and prevents vibration in the quartz sleeve in a UV water reactor.

A second objective of the present invention is to provide an attachment assembly that would provide another point of contact within the cylinder of the UV water reactor to maintain the quartz sleeve in a fixed straight position without sagging or bending upward due to buoyancy.

A third objective of the present invention is to provide an attachment assembly that would maintain or stabilize the quartz sleeve at a location within the cylinder and provide support around the quartz sleeve at 360 degrees.

A fourth objective of the present invention is to provide an attachment assembly that would keep the UV lamp centered within the quartz sleeve for increased lamp performance and efficiency.

Another objective of the present invention is to provide an attachment assembly that would guide the quartz sleeve through the cylinder, from first endplate to second endplate, and ease the process of installation.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means+/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
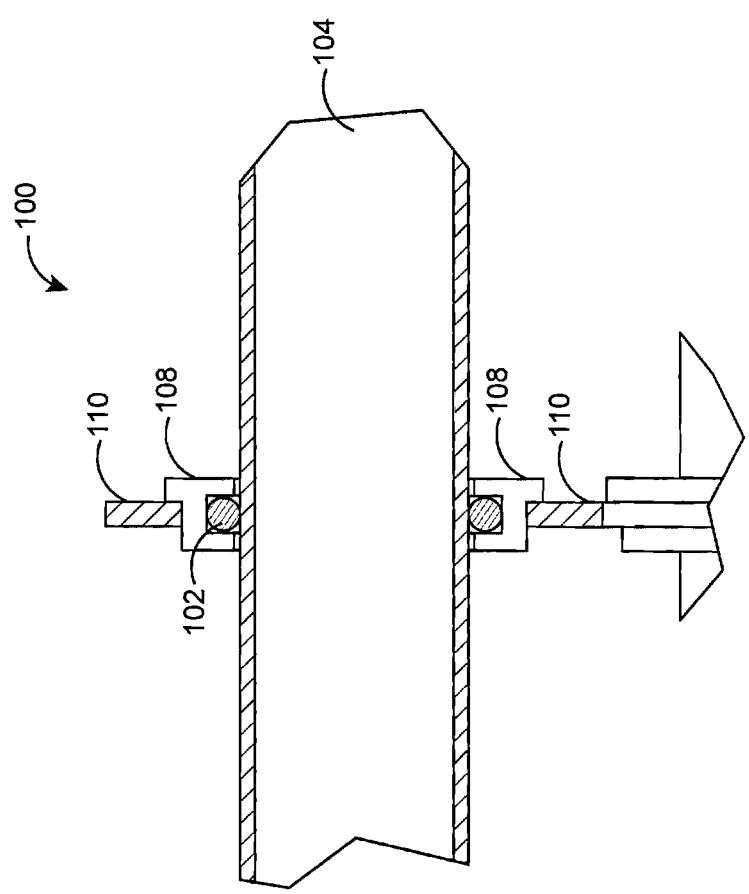
FIG. 1 illustrates a cross-sectional view of an attachment assembly holding a quartz sleeve in accordance with the preferred embodiment of the present invention.

Referring to FIG. 1, a cross-sectional view of an attachment assembly 100 holding a quartz sleeve 104 in accordance with the preferred embodiment of the present invention is illustrated. The attachment assembly 100 for supporting the quartz sleeve 104 comprises at least one vibration resistant member 102, a collar attachment member 108 and a support plate 110. The at least one vibration resistant member 102 is adaptable to hold and support the quartz sleeve 104 positioned inside an ultraviolet (UV) cylinder 106 of a water reactor (not shown) and thereby to prevent its vibration. The at least one vibration resistant member 102 is an O-ring which is made from a material selected from a group consisting of: Teflon, rubber, elastomer, or a metal spring. The collar attachment member 108 is configured to enclose the at least one vibration resistant member 102. The at least one vibration resistant member 102 is positioned inside the collar attachment member 108 and surrounds the quartz sleeve 104 to hold it in a straight position The collar attachment member 108 has a structure to hold the at least one vibration resistant member 102, preferably the O-ring, steady. The at least one vibration resistant member 102 is enclosed by the collar attachment member 108 such that there is little to no space left therebetween and hence allows no free movement between the members. The support plate 110 is configured to attach the collar attachment member 108 containing the at least one vibration resistant member 102 with the UV cylinder 106. The attachment assembly 100 can be attached to the UV cylinder 106 directly or can be attached to a ring 112 positioned inside the UV cylinder 106. When the attachment assembly 100 is attached inside with the UV cylinder 106, the quartz sleeve 104 is guided through the at least one vibration resistant member 102 from a first end plate 114 to a second end plate 116 of the UV cylinder 106. Thus the at least one vibration resistant member 102 enclosed by the collar attachment member 108 guides the quartz sleeve 104 therethrough and prevents its vibration.

Figure 2:
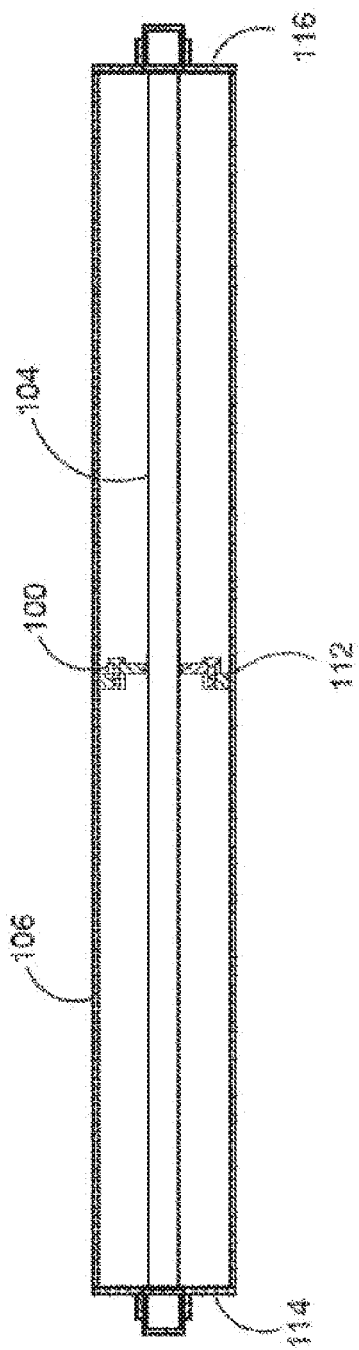
FIG. 2 illustrates a sectional view of the attachment assembly attached to the ring on the inner side of the UV cylinder holding the quartz sleeve in accordance with the preferred embodiment of the present invention.

FIG. 2 illustrates a cross-sectional view respectively of the attachment assembly 100 attached to the ring 112 on the inner side of the UV cylinder 106 of the water reactor (not shown) holding the quartz sleeve 104. The support plate of the attachment assembly is attached to the ring as shown in FIG. 2. The ring 112 is positioned at a fixed position at a distance away from the first end plate 114 and the second end plate 116 of the UV cylinder 106.

Figure 3A:
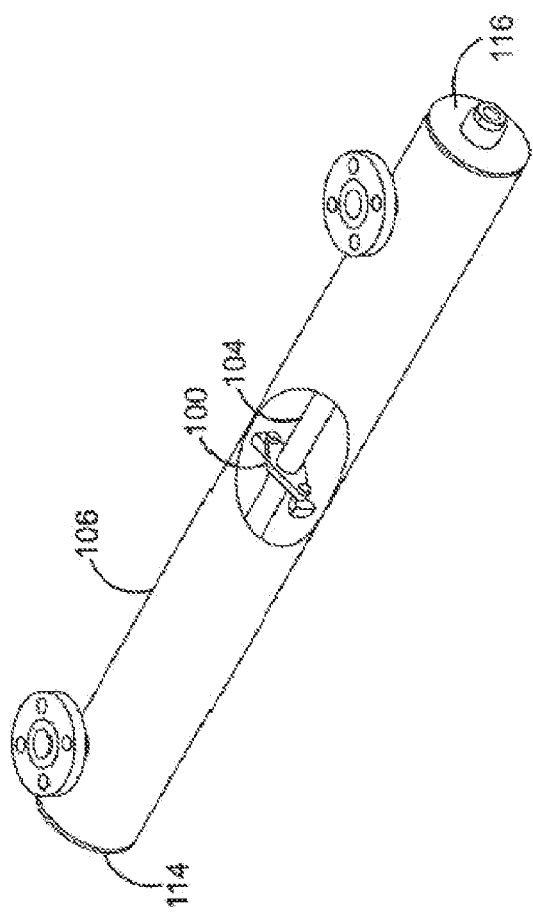
FIG. 3A is a cut out view of the attachment assembly attached directly to the inner side of the UV cylinder of the water reactor holding the quartz sleeve in accordance with the preferred embodiment of the present invention.
Figure 3B:
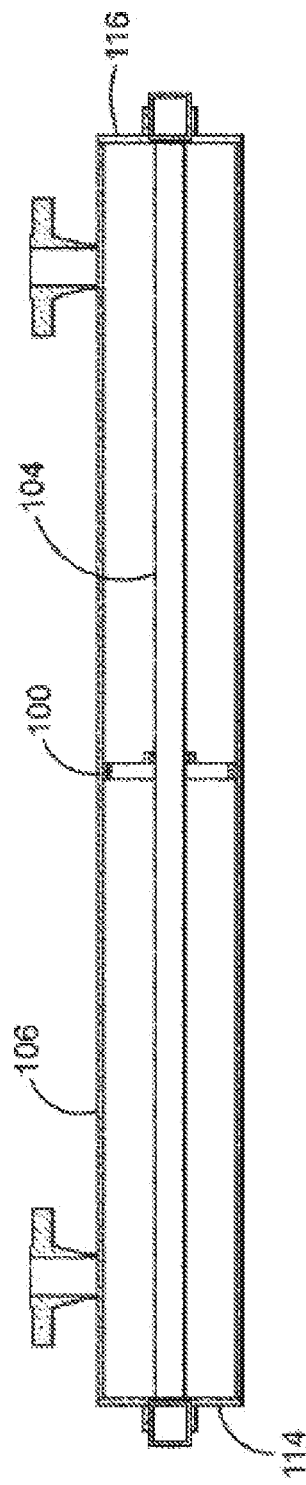
FIG. 3B is a sectional view of the attachment assembly attached directly to the inner side of the cylinder holding the quartz sleeve in accordance with the preferred embodiment of the present invention.

FIGS. 3A and 3B illustrate a cut out view and cross-sectional view respectively of the attachment assembly 100 attached directly to the inner side of the UV cylinder 106 holding the quartz sleeve 104. The attachment assembly 100 is fixed inside the UV cylinder 106 at a distance away from the first end plate 114 and the second end plate 116.

The attachment assembly 100 allows the quartz sleeve 104 to be supported by the at least one vibration resistant member 102 to ensure that it is maintained in a fixed straight position. The at least one vibration resistant member 102 stabilizes the quartz sleeve 104 while it is supported by the attachment assembly 100. The attachment assembly 100 is designed to provide another point of contact with the cylinder 106 which otherwise was only supported at both end plates 114 and 116. By providing another point of contact with the cylinder 106, the attachment assembly 100 reduces the amount of vibration of the quartz sleeve 104 during operation. Thus the at least one vibration resistant member 102 and the collar attachment member 108 of the attachment assembly 100 provide 360 degrees of support around the quartz sleeve 104 which reduces and eliminates vibration during operation.

Figure 4:
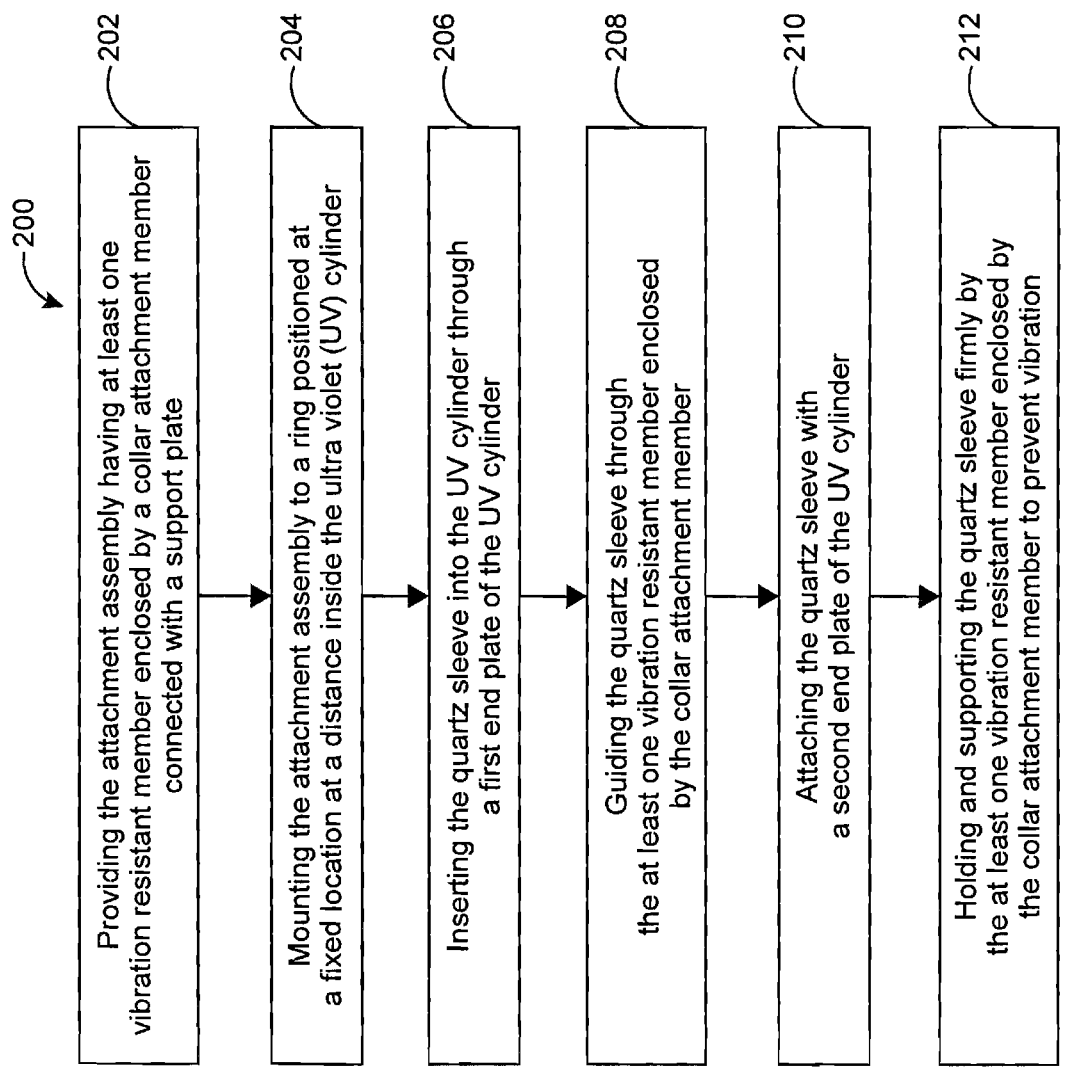
FIG. 4 shows a flow chart of a method for utilizing an attachment assembly for preventing vibration of a quartz sleeve positioned inside the UV cylinder in accordance with the preferred embodiment of the present invention.

FIG. 4 shows a flow chart of a method 200 for utilizing an attachment assembly for reducing and preventing vibration of a quartz sleeve positioned inside the UV cylinder. The method comprises the steps of: providing the attachment assembly having at least one vibration resistant member enclosed by a collar attachment member connected with a support plate as shown in block 202. Mounting the attachment assembly to a ring positioned at a fixed location at a distance inside the UV cylinder as indicated in block 204. Then inserting the quartz sleeve into the UV cylinder through a first end plate of the UV cylinder as indicated in block 206. As indicated in block 208, guiding the quartz sleeve through the at least one vibration resistant member enclosed by the collar attachment member and attaching the quartz sleeve with a second end plate of the UV cylinder as indicated in block 210. Holding and steadily supporting the quartz sleeve by the at least one vibration resistant member enclosed by the collar attachment member to prevent vibration as indicated in block 212.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto

What is claimed is:

1. An attachment assembly for supporting a quartz sleeve fixed to a first watertight plate and a second watertight plate at opposing ends of an ultraviolet (UV) cylinder to a center location of a UV cylinder, comprising:
    at least one vibration eliminating member adaptable to support and eliminate vibrations at the center of the quartz sleeve fixed to the inside surface of an UV cylinder;
    a collar attachment member configured to enclose the at least one vibration eliminating member such that there is little to no gap left therebetween; and
    a support plate connected to the inside surface of the UV cylinder, extending along a radial direction of the quartz sleeve and configured to attach the collar attachment member containing the at least one vibration eliminating member with the UV cylinder;
    whereby the at least one vibration eliminating member enclosed by the collar attachment member supports and secures the quartz sleeve to the support plate through 360° compression of the vibration eliminating member acting upon the outside surface at the center of the quartz sleeve, and keeps the quartz sleeve straight between the two fixed ends.

2. The attachment assembly of claim 1 wherein the at least one vibration eliminating member is an O-ring that provides 360° compression to the outside surface of the quartz sleeve.

3. The attachment assembly of claim 1 wherein the at least one vibration eliminating member is made from a material selected from the group consisting of: Teflon encapsulated O-ring, rubber or elastomer.

4. The attachment assembly of claim 1 wherein the at least one vibration eliminating member is compressed 360° around the outside surface of the quartz sleeve.

5. The attachment assembly of claim 1 wherein the at least one vibration eliminating member maintains the center of the quartz sleeve in a straight position.

6. The attachment assembly of claim 1 wherein the configuration of the collar attachment member and the at least one vibration eliminating member allows only natural compression movement therebetween.

7. The attachment assembly of claim 1 is mounted inside of the UV cylinder by means of a fixed ring design attached to the inside surface of the UV cylinder positioned at a fixed distance centered away from the first watertight plate and the second watertight plate of the UV cylinder.

8. The attachment assembly of claim 7 can be mounted to the inside surface of the UV cylinder at a distance centered away from the first watertight plate and the second watertight plate.

9. An attachment assembly for supporting a quartz sleeve positioned at a centered location inside an ultraviolet (UV) cylinder for fluid treatment, that is fixed to a first watertight plate and a second watertight plate at opposing ends of the UV cylinder, comprising:
    at least one vibration eliminating member configured to support the quartz sleeve, the at least one vibration eliminating member coupled by compression to the outside surface of the quartz sleeve;
    a collar attachment member adaptable to enclose the at least one vibration eliminating member, the at least one vibration eliminating member enclosed by the collar attachment member such that there is no space left therebetween; and
    a support plate connected to the inside surface of the UV cylinder, extending along a radial direction of the quartz sleeve and configured to attach the collar attachment member containing the at least one vibration eliminating member fixed to the inside surface of the UV cylinder;
    whereby the at least one vibration eliminating member enclosed by the collar attachment member secures the center of the quartz sleeve to the inside surface of the UV cylinder body therethrough and holds it steady, fixed to the first and second watertight plates, to prevent vibration.

10. The attachment assembly of claim 9 wherein the at least one vibration eliminating member is an O-ring that provides 360° compression to the outside surface of the quartz sleeve.

11. The attachment assembly of claim 9 wherein the at least one vibration eliminating member and the collar attachment member eliminate vibration at the center of the quartz sleeve.

12. The attachment assembly of claim 9 wherein the at least one vibration eliminating member is made from a material selected from the group consisting of: Teflon encapsulated O-ring, rubber or elastomer.

13. The attachment assembly of claim 9 wherein the at least one vibration eliminating member maintains the center of the quartz sleeve in a straight position.

14. The attachment assembly of claim 9 wherein the configuration of the collar attachment member and the at least one vibration eliminating member allows minimum natural movement therebetween.

15. The attachment assembly of claim 9 is mounted inside of the UV cylinder by means of a fixed ring design attached to the center of the inside surface of the UV cylinder positioned at a fixed distance centered away from the first watertight plate and the second watertight plate of the UV cylinder.

16. The attachment assembly of claim 15 can be mounted directly inside to the inside surface of the UV cylinder at a distance away from the first watertight plate and the second watertight plate.

17. A method for utilizing an attachment assembly for eliminating vibrations at the center of a quartz sleeve fixed to a first watertight plate and a second watertight plate at opposing ends of an ultraviolet (UV) cylinder to a center location of a UV cylinder during high flow applications, the method comprising the steps of:
 a) providing the attachment assembly having at least one vibration eliminating member in the form of an o-ring, enclosed by a collar attachment member configured such that there is little to no gap left therebetween, connected with a support plate connected to the inside surface of the UV cylinder, extending along a radial direction of the quartz sleeve;
 b) mounting the attachment assembly to the inside surface of the UV cylinder by means of a fixed ring design attached to the inside surface of the UV cylinder positioned at a fixed location at a distance centered away from the first watertight plate and the second watertight plate of the UV cylinder;
 c) inserting the quartz sleeve into the UV cylinder through the first watertight plate of the UV cylinder;
 d) guiding the quartz sleeve through the at least one vibration eliminating member enclosed by the collar attachment member;
 e) attaching the quartz sleeve at a fixed position at a distance away from the first watertight plate and the second watertight plate of the UV cylinder; and
 f) holding and steadily supporting the quartz sleeve to the support plate connected to the inside surface of the UV cylinder by the at least one vibration eliminating member enclosed by the collar attachment member through 360° compression of the vibration eliminating member acting upon the outside surface of the quartz sleeve to prevent vibration and keep the quartz sleeve straight between the two fixed ends.

* * * * *